April 21, 1959 A. A. CURRY 2,883,521

RADIO DISPATCHING SYSTEM FOR RAILROAD USE

Filed Oct. 23, 1952 3 Sheets-Sheet 1

INVENTOR.
Arnet A. Curry
BY Norman L. Mueller
Atty

INVENTOR.
Arnet A. Curry.
BY Norman L. Mueller
Atty.

April 21, 1959 A. A. CURRY 2,883,521

RADIO DISPATCHING SYSTEM FOR RAILROAD USE

Filed Oct. 23, 1952 3 Sheets-Sheet 3

INVENTOR.
Arnet A. Curry
BY Norman L. Mueller
Atty

United States Patent Office 2,883,521

Patented Apr. 21, 1959

2,883,521

RADIO DISPATCHING SYSTEM FOR RAILROAD USE

Arnet A. Curry, Elmhurst, Ill., assignor to Motorola, Inc., Chicago, Ill., a corporation of Illinois Application October 23, 1952, Serial No. 316,395

16 Claims. (Cl. 250—6)

This application relates generally to communication systems and more particularly to a radio dispatching system for mainline railroad use to provide control of the operation within a division by the dispatcher thereof.

Mainline railroad activity is divided as to operation into divisons, each of which is controlled by a dispatcher, with direct control of the trains being made through wayside stations located along the track. These wayside stations have operators who are in communication with the dispatcher through a telephone system, and the various operators give signals to the trains in various manners to thereby provide a coordinated system under the control of the dispatcher.

Such systems have several disadvantages, first, the dispatcher has no direct contact with the trains, but must contact the trains through the wayside operators. Second, messages may be given to the train only at the wayside stations with no contact being possible intermediate the stations. Because of this, to provide close control of the trains it is necessary that the wayside stations be positioned close together and this results in the need for a large number of stations and a corresponding large number of operators. Such systems also depend upon the wire line interconnecting the various stations and therefore fail in the event of a break in the wire line.

It is therefore an object of the present invention to provide an improved railway dispatch communication system for providing intercommunication between the dispatcher and the wayside stations and to the trains in a division.

A further object of this invention is to provide a radio communication system for controlling mainline railroad activity which provides direct and continuous communication between the dispatcher and the trains within the division.

Another object of the invention is to provide a communication system which operates through a communication channel interconnecting the dispatcher and wayside stations of a division, and which provides radio communication from the wayside stations to a train, and which may also provide radio communication between adjacent wayside stations to complete the control circuit from the dispatcher in the event of a break in the communication channel.

Still another object of the invention is to provide a radio dispatch communication system wherein radio equipment is provided at the wayside stations for communicating with a train and in which the radio may be controlled either locally by the wayside station operator or remotely by the dispatcher through a communication channel interconnecting the dispatcher with the wayside stations.

A feature of this invention is the provision of a radio communication system for mainline railroad use wherein the dispatcher is connected to wayside stations by a communication channel including control equipment at the dispatcher office for selecting the desired wayside stations, and radio transmitting and receiving equipment at the wayside stations for communicating with trains.

Another feature of the invention is the provision of equipment controlled at the dispatcher office which in addition to selecting the desired wayside station may also select the frequency of the radio equipment thereat, provide push-to-talk operation of the radio equipment, and may mute the non-selected stations.

Still another feature of the invention is the provision of switching means at the wayside stations to condition the system for local operation of the radio equipment, intercommunication between the dispatcher and the wayside station, and dispatch operation whereby the dispatcher controls and communicates over the radio equipment.

A further feature of the invention is the provision of a radio railway dispatch system which includes control equipment for communication over radio equipment from either the wayside stations or from the dispatcher office, with emergency provisions whereby one wayside station can be controlled from another wayside station and whereby intercommunication can be provided between adjacent wayside stations over the radio equipment in the event of failure of the communication channel between the adjacent wayside stations.

Still a further feature of the invention is the provision of automatic means for controlling signal levels so that dependable operation takes place, with separate adjustable controls for signals from different sources being provided for satisfactory monitoring. The system permits the monitoring of the dispatch communication channel during radio reception or while communicating with any station.

Further objects and features, and the attending advantages of the invention will be apparent from a consideration of the following description when taken in connection with the following drawings, in which.

In practicing the invention there is provided a radio communication system for control of the mainline railroad activity within a division from the dispatcher office, including control equipment at the dispatcher office connected to a dispatch circuit and control equipment at the wayside stations connected to the dispatch circuit and also connected with radio equipment for communicating with radio equipment on a train. The equipment at the dispatcher office includes an amplifier for feeding a loudspeaker for monitoring the dispatch circuit and a microphone connected through an amplifier to the circuit. Generator means are provided for generating control signals which may be transmitted over the dispatch circuit for selectively rendering controls in the individual wayside stations operative and for providing controls at the wayside station which may be used for providing push-to-talk operation of the radio equipment thereat, selecting the frequency of the radio equipment, etc. The various control signals and the signals from the microphone are applied to the same amplifier, with separate volume controls controlling the levels of the two different signals. The receiver at the dispatcher office is operative to monitor the control channel at all times even when the dispatcher is transmitting, with the level being changed during transmission to provide more satisfactory operation.

At each wayside station, selector means is provided which responds to the signals applied from the dispatcher office to connect the wayside station to the dispatch circuit. Amplifier and reproducing means are connected to the dispatch circuit to permit continuous monitoring thereof. The equipment also includes means for providing push-to-talk operation of the transmitter, control of the frequency thereof, and muting of the various wayside stations in response to control signals from the dispatcher office. The wayside station control units include switches for conditioning the same to provide only local control of the radio equipment, control of the radio equipment by either the local wayside station or from the dispatcher office, or intercommunication between the dispatcher office and the wayside station. Switches are also provided for emergency operation to select a desired wayside station so that interconnection may be provided between the radio equipment of adjacent wayside stations to bridge a failure in the dispatch circuit. In order to provide good communication at all the wayside stations, which may be positioned at widely different distances from the dispatcher office, compression amplifiers are provided for incoming signals at all stations, to produce output signals of substantially constant amplitude for incoming signals varying widely. This is particularly necessary to provide proper operations from the control signals.

Figure 1:
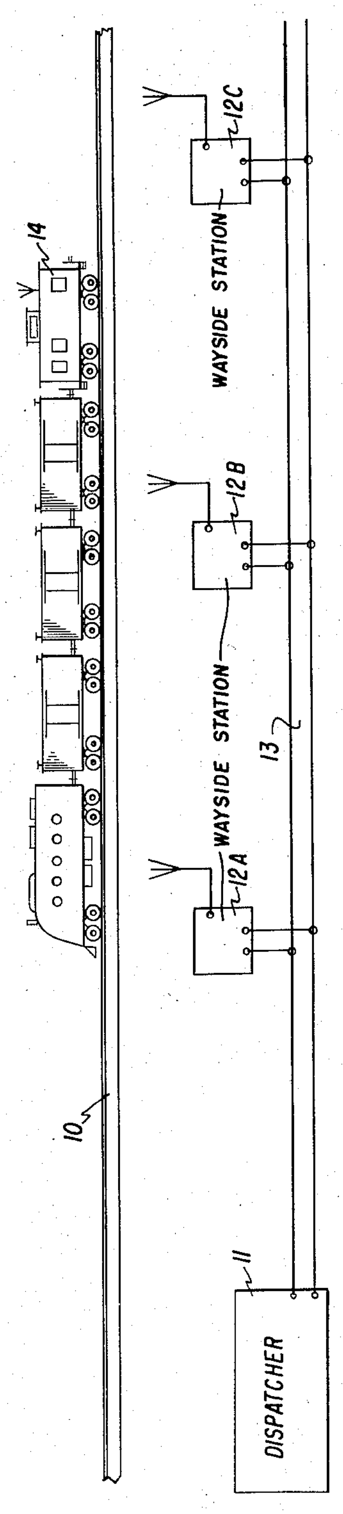
Fig. 1 illustrates schematically a system in accordance with the invention.

Referring now to the drawings, in Fig. 1 there is illustrated, in a general way, the application of the system to a railroad having a track 10, a dispatcher office 11, and a plurality of wayside stations 12. The dispatcher office 11 and the wayside stations 12 are interconnected by a communication channel such as a wire line 13. Each of the wayside stations 12 includes radio equipment for communicating with radio equipment on the train 14. It will be obvious that one of the wayside stations may be located at the dispatcher office if it is desired to communicate with trains at this point.

The communication system in accordance with the invention permits the dispatcher to communicate with the operators at the wayside stations, permits the wayside stations to communicate by radio with the train, and permits the dispatcher to communicate directly with the train through the wayside stations. The dispatcher can select the wayside station he desires, and can completely control the transmitter thereat by the use of push-to-talk controls, and can select the desired frequency.

Figures 2, 3:
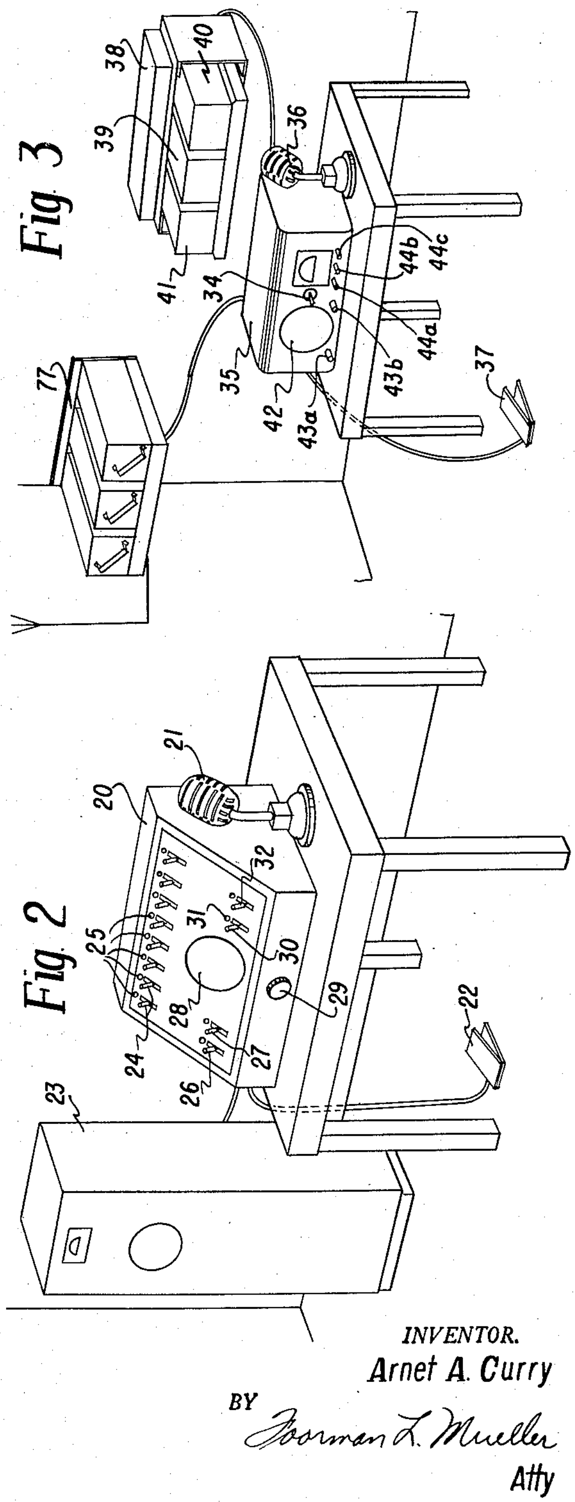
Fig. 2 illustrates pictorially the equipment provided at the dispatcher office.
Fig. 3 illustrates pictorially the equipment required at a wayside station.

In Fig. 2 there is shown the equipment provided at the dispatcher office. This includes the dispatch control consolette 20, a microphone 21, a push-to-talk switch which may be a foot switch 22, and a standard rack mounting cabinet 23 which includes line terminating equipment, filters, amplifiers, and tone generating and responsive units as will be described more fully. The control consolette 20 includes eight switches 24 which are for selecting eight individual wayside stations. In the event that there is a greater number of wayside stations in the system, an auxiliary console unit may be provided with additional facilities. Indicator lights 25 are provided for indicating the wayside stations which have been selected. The keys 24 have on, off and neutral positions and are arranged in a circuit so that the stations selected will be held until the switch is moved to the off position. As will be more fully explained, one or more stations may be selected at a time.

The consolette 20 also includes a switch 26 for controlling the frequency of the transmitter to select one of two frequencies which may be provided in the system. The switch 27 is provided for simultaneous selecting all the wayside stations. This key therefore makes it unnecessary to operate all of the keys 24 in the event that it is desired to communicate simultaneously with all of the wayside stations. The keys 26 and 27 have lights to indicate the positions thereof. A loudspeaker 28 is provided in the consolette which is normally connected to the line and therefore reproduces messages from all of the wayside stations. A volume control 29 is provided for controlling the level of the loudspeaker 28.

A key 30 is provided which may be operated to mute all the wayside stations except the ones which have been selected. That is, if the operator wants to communicate with a particular wayside station and does not want communications from the other stations to interfere, he can mute all of the stations except the one or more stations which have been selected. The light 31 associated with the switch 30 is arranged to flash when the mute switch is on so that the operator is made aware of this. This is to prevent unintentional operation of this switch, as in this condition the dispatcher would not hear calls from the stations not selected.

The switch 32 serves three functions. In the upper position marked "Radio" it serves to connect the push-to-talk tones. The switch is mechanically arranged to lock in this position so that it will stay in this position and not return to the neutral position until moved thereto by the operator. In the neutral position, marked "Intercom" switch 32 disconnects the push-to-talk tones so that no radio stations can be operated from the dispatcher office, but all other functions may be performed as indicated. The lower position of the switch 32 is a ringing position and may be used to ring a wayside station which has been selected.

In Fig. 3 there is illustrated the equipment provided at the wayside stations. This includes the wayside control unit 35, microphone 36 and push-to-talk switch 37 which may be a foot operated switch, as illustrated. It is to be pointed out, however, that the microphone and switch may be of any desired construction, and a handset including a switch may be used. The control equipment at the wayside station is provided in a mounting rack and includes a termination and filter unit 38, a selector unit 39, an incoming amplifier unit 40, and an outgoing amplifier unit 41. These units will be described more in detail hereinafter. The wayside stations also include radio equipment 77 which may be located remotely from the other equipment if desired. This may be standard radio equipment such as very high frequency equipment which has been used in various mobile applications. Similar equipment is, of course, required on the train to communicate between the wayside stations and the trains. The wayside control unit includes a loudspeaker 42, volume controls **43*a* and 43*b* for separately controlling the levels of the signals from the dispatch circuit and from the radio equipment, and interlocked switches 44*a*, 44*b* and 44*c*. Operation of switch 44*a* provides dispatch operation wherein the radio may be controlled by either the dispatcher or the wayside operator. Switch 44*b* provides intercommunication between the wayside stations and the dispatcher. And switch 44*c* provides local operation wherein the radio is controlled by the local wayside station operator only. A key 34** is provided for selecting the frequency of the transmitter when it is operated from the wayside control unit.

Figure 4:
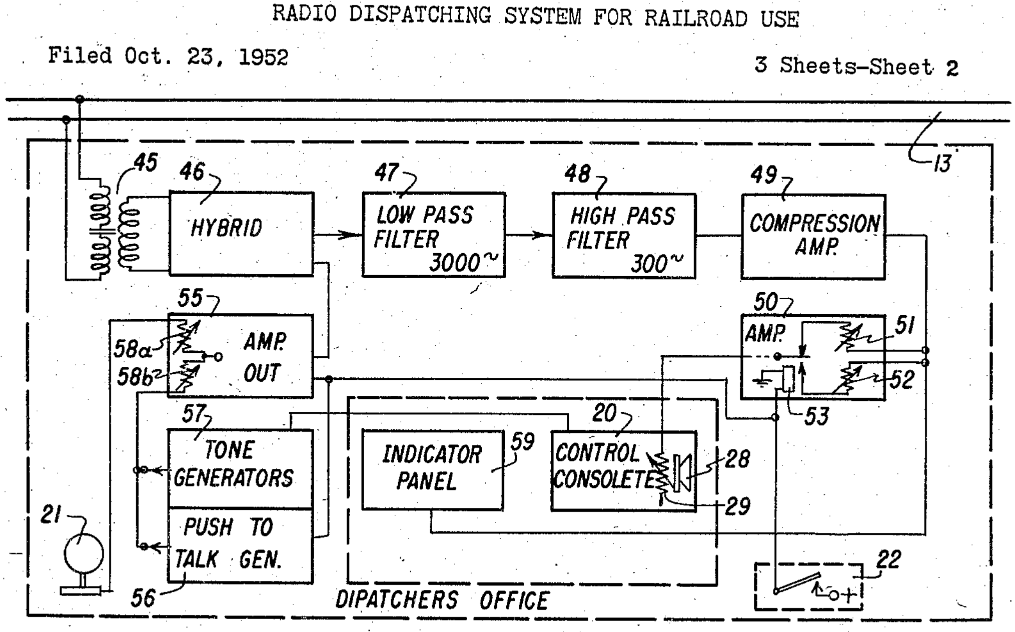
Fig. 4 is a schematic diagram of the equipment at the dispatcher office.

In Fig. 4 there is shown a schematic diagram which illustrates the equipment at the dispatcher office. It will be noted that the equipment is connected to the dispatch circuit 13 through the coupling transformer 45, with the incoming and outgoing signals being separated by a hybrid 46. The incoming signals are passed through a low pass filter 47 which removes all frequencies above 3,000 cycles per second. The signals are then passed through the high pass filter 48 which removes all signals below 300 cycles per second. The signals are then applied to a compression amplifier 49 which provides an output of substantially constant level for inputs varying over a very wide range of levels.

The output of the compression amplifier is applied to the amplifier 50 being applied through two separate input circuits 51 and 52. A relay 53 which is controlled by the foot switch 22 selectively connects the input circuits 51 and 52 to the amplifier. The two inputs are provided so that the level to the amplifier may be changed during transmission and reception. In the normal receiving position the input circuit 51 is connected to the amplifier and provides a level sufficient that relatively loud audio signals are available from the loud speaker 28 of the control consolette 20. During transmissions the relay 53 operates to disconnect the input circuit 51 and connect the input circuit 52 so that the level into the amplifier 50 is decreased. This results in a decrease in the level of the signal from the loudspeaker 28 so that while the loudspeaker 28 still monitors the dispatch circuit at all times, the level of the monitored signal is reduced during transmission at the dispatcher office.

Signals from the dispatcher office are applied to the dispatch circuit 13 from the microphone 21 which is connected through the amplifier 55 to the hybrid 46. Signals from the tone generators 56 and 57 are also applied to the amplifier 55, with the signals from the microphone and from the tone generators being applied to separate input circuits so that the levels thereof may be separately controlled. The level control **58*a* controls the level from the microphone, and the level control 58*b* controls the level from the tone generator. The tone generator 56 is rendered operative when the push-to-talk switch 22** is closed to send out control signals such as tones which operate control equipment at the wayside stations.

The tone generators 57 provide the control signals required to produce the various control functions which may be selected at the control consolette. That is, control signals for selecting the station, for selecting the frequency at a selected station, for providing group call, muting or ringing at a selected station. The tone generators 56 and 57 and the operation thereof by the control consolette may be in accordance with Waterman et al. Patent 2,583,032.

Figure 5:
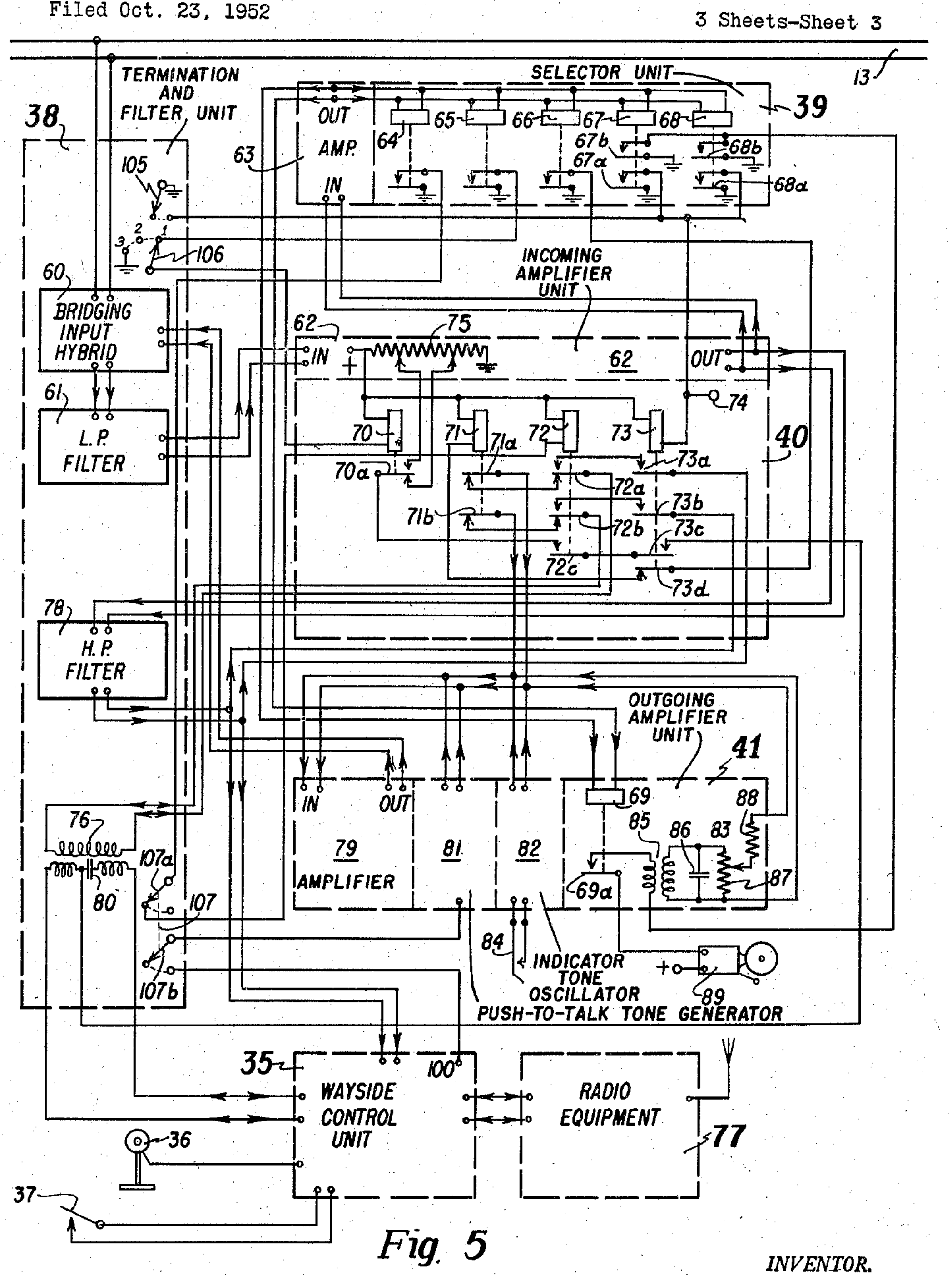
Fig. 5 is a schematic diagram of the equipment at the wayside stations.

The equipment at each wayside station is illustrated by the schematic diagram of Fig. 5. Connection is made to the dispatch circuit 13 through the hybrid 60 which is a part of the termination and filter unit 38. The incoming signals are applied through the low pass filter 61 which removes signals above 3,000 cycles per second and are applied to the compression amplifier 62 in the incoming amplifier unit 40. The output from the compression amplifier is applied to the wayside control unit 35 through the high pass filter 78 which removes the control signals which are of lower frequency, for example, below 300 cycles per second. The signals are reproduced at the wayside control unit 35 in the loudspeaker or receiver thereof.

The output of the compression amplifier 62 is also applied to the input of the amplifier 63 in the selector unit 39, with the output of the amplifier being applied to the individual selectors 64, 65, 66, 67 and 68 in the selector unit 39, and also to the selector 69 in the outgoing amplifier unit 41. The selectors 64 to 69 inclusive may be of the frequency or tone selecting type, with the unit 64 being of the type wherein the relay is closed during the presence of the tones and as disclosed in Lense et al. Patent 2,547,023. As these tones are present during transmission, frequencies must be used which are below the voice frequencies such as 280 and 300 cycles per second. These can be removed by the high pass filters. The units 65, 66, 67, 68 and 69 are of the type wherein the relays are closed in response to one signal and opened in response to another and may be of the type disclosed in Taylor Patent 2,524,300. Such signals are transmitted only momentarily and can be frequencies within the voice range.

The contacts of the frequency selectors in the selector unit 39 are connected to the relays 70, 71, 72 and 73 in the incoming amplifier unit 40. The relay 70 is connected to the contacts of the selector 65 through the switch 106 and is energized when the selector 65 responds to control the frequency of the transmitter. This is accomplished by selectively connecting the movable relay contact **70*a* to points of different potential on the potentiometer 75 in the compression amplifier 62. When the relay 70 is released as shown, the contact 70*a* is connected to a relatively low potential, and when the relay 70 is actuated, the contact 70*a* is connected to a higher potential. This connection is completed through the contacts of relays 72 and 73, when actuated, to the coupling transformer 76 of the termination and filter unit. This transformer has a condenser 80 between the two secondary sections so that the D.C. control voltage may be applied through the line to the wayside control unit 35 to the radio equipment 77**.

The relay 71 controls the muting of the wayside station and is operated by the contacts of the selector 66, through the normally closed contacts **73*d* of the relay 73. The relay 71 opens contacts 71*a* and 71*b* to open the circuit from the coupling transformer 76 of the termination and filter unit 38 to the outgoing amplifier 79 of the outgoing amplifier unit 41. This prevents signals from the wayside station being applied to the dispatch circuit. This circuit is also broken by the contacts 72*a* and 72*b* of the relay 72 which is controlled by the selector 64**.

The selector unit 64 and the relay 72 provide push-to-talk operation of the radio equipment when operated by the dispatcher. Connection between the selector contacts and the relay 72 is made through the contacts **107*a* of switch 107 which will be further described. The contacts 72*a* and 72*b* selectively connect the coupling transformer 76 through the contacts of mute relay 71 to the outgoing amplifier 79 for transmitting over the dispatch circuit from the wayside station, or through the contacts 73*a* and 73*b* of the selecting relay 73 to the high pass filter 78 for receiving at the wayside station. That is, the contacts 72*a* and 72*b* normally provide a connection for outgoing signals from the transformer 76, and when the push-to-talk switch at the dispatcher office is operated and the selector 64 responds thereto to close the relay 72, the incoming signals from the compression amplifier are applied through the contacts of relays 72 and 73 to the coupling transformer 76** and to the wayside control unit and/or the radio equipment.

The relay 73 is for selecting the desired wayside station or stations and is controlled by the selectors 67 and 68. The selector 67 responds to a control signal associated with the individual wayside station and when this operates, the contacts **67*a* thereof are closed to energize the relay 73. The selector unit 68 responds to the group call which may be sent by the dispatcher and closes the contact 68*a* thereof and also energizes the relay 73. When the relay 73 is energized, the contacts 73*a* and 73*b* are closed to apply signals from the compression amplifier to the contacts of relay 72, the contacts 73*d* are opened so that the muting circuit is disabled and the contacts 73*c* are closed to complete the series circuit through contacts 72*c*** which apply the frequency selecting voltage to the transmitter.

The outgoing amplifier unit 41, in addition to including the outgoing amplifier proper 79, and the tone selector unit 69, includes an emergency push-to-talk tone generator 81, an indicator tone oscillator 82, and a circuit for providing an indication of the operation of the ringing device 89 at the wayside station 83. The indicator tone oscillator 82 may be operated by any external switch means 84 to provide a tone through the outgoing amplifier 79 to the dispatch circuit. The dispatcher equipment may include an indicator panel 59 which indicates the operation of the key at the wayside stations. The tones or other signals from the individual wayside stations may be of different frequencies or otherwise coded so that the indicator panel will indicate from which stations a signal is originating.

The selector 69 is operative to close contacts 69*a* thereof to complete the circuit to a call bell 89 or the like when the individual wayside station has been selected as indicated by the response of the units 67 or 68 and when the ringing key is then operated. This circuit is completed through the contacts 67*b* or 68*b* which are connected in parallel. In order that the dispatcher will know that ringing is actually taking place, the transformer 85 is provided in the ringing circuit to pick up the interruptions provided by the call bell or buzzer 89. The secondary of the transformer is tuned by condenser 86 and a portion of a signal across the resistor 87 is applied through resistor 88 to the outgoing amplifier 79 and therefore is transmitted over the dispatch circuit to the dispatcher. The dispatcher can therefore hear a buzz which results from the vibration in the call bell 89 and therefore knows that ringing is actually taking place at the wayside station.

Figure 6:
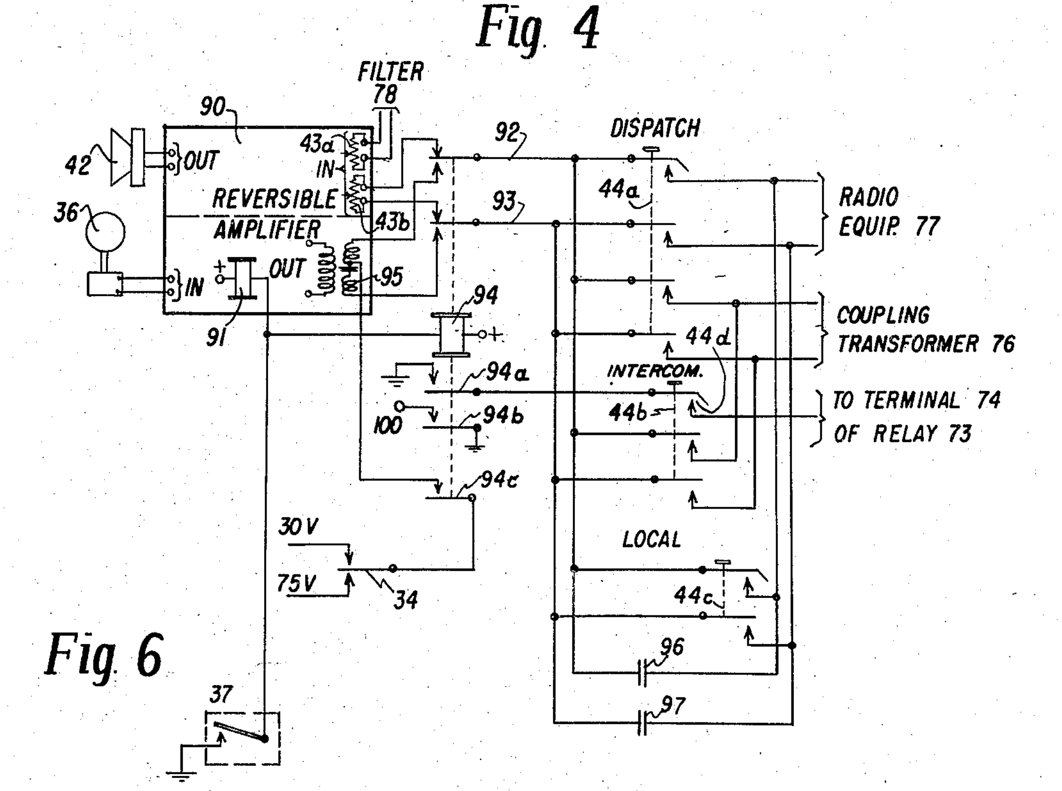
Fig. 6 illustrates the connections of the wayside station control unit.

In Fig. 6 there is illustrated more in detail the structure of the wayside control unit 35. This control unit includes a reversible amplifier 90 which in one condition amplifies the signals from the high pass filter 78 and signals from the radio equipment and applies them to the loudspeaker 42. The separate volume controls 43*a* and 43*b* shown in Fig. 3 are for controlling the two separate inputs to the amplifier when in the first condition. The reversible amplifier in the second condition applies signals from the microphone 36 to the output which is connected to the radio equipment and/or to the dispatch circuit depending upon the system connection provided in the control unit.

The relay 91 in the reversible amplifier changes the condition of the amplifier in accordance with the operation of the foot switch 37. When the switch is open, the amplifier 90 amplifies signals entering from the right at the top, with the output being coupled to the loudspeaker 42. When the switch 37 is depressed and the relay 91 is energized, the reversible amplifier 90 amplifies the signals from the microphone 36 and applies them to the output coupling transformer 95. The input and output terminals of the amplifier 90 are selectively connected to lines 92 and 93 by the relay 94 which is also operated by the push-to-talk switch 37. In the open position the input to the reversible amplifier 90 is connected to the lines 92 and 93, and when the switch 37 is operated the output of the reversible amplifier 90 is connected to these two lines.

The lines 92 and 93 are connected to the radio equipment and/or to the coupling transformer 76 and to the dispatch circuit. These connections are controlled by the interlocked switches 44*a*, 44*b* and 44*c* on the wayside control unit. When the switch 44*a* is operated, the lines 92 and 93 are connected both to the radio equipment 77 and to the coupling transformer 76 so that the wayside control unit is connected to the radio equipment, and both the wayside control unit and the radio equipment are connected to the dispatch circuit. This permits control of the radio equipment either by the local wayside operator, or by the dispatcher over the dispatch circuit.

When the intercommunicating switch 44*b* is operated, the lines 92 and 93 are connected to the coupling transformer 76 and thence to the dispatch circuit so that intercommunication may be provided between the wayside operator and the dispatcher. The switch 44*b* includes contacts for connecting the lines 92 and 93 to the coupling transformer 76, and contacts 44*d* for providing a circuit through the contacts 94*a* of relay 94 to the select relay 73. This operates the select relay 73 when the push-to-talk switch 37 is operated, so that the incoming circuit from the highpass filter 78 is completed and the dispatcher can communicate with the particular station without it being necessary for the dispatcher to select the individual wayside station, since the selection action takes place automatically through the switch contact 44*d*. Condensers 96 and 97 are provided connecting the radio equipment to the lines 92 and 93 so that during intercommunication between the wayside operator and the dispatcher, signals received from the radio equipment will be applied at a lower level to the reversible amplifier 90 and will be reproduced in the loudspeaker 42 so that the wayside operator will not miss any calls from a train.

The operation of the switch 44*c* provides local operation of the radio equipment only, and connects the lines 92 and 93 to the radio equipment 77. Under such conditions the wayside operator only can control the radio equipment and the dispatcher cannot communicate over this equipment. The relay 94 in the wayside control unit includes contacts 94*b* which are connected to the terminal 100 to provide a ground connection for energizing the emergency tone generator 81.

The relay 94 in the wayside control unit includes additional contacts 94*c* for providing local push-to-talk operation. The contacts 94*c* provide a voltage to the coupling transformer 95 in the output of the reversible amplifier which is applied to the radio equipment, providing push-to-talk operation and controlling the frequency of the transmitter. The frequency selected depends upon the setting of the switch 34 in the wayside control unit, with the switch 34 having one position in which a first voltage such as 30 volts is applied thereto for selecting the first frequency, and a second position wherein a greater voltage such as 75 volts is applied thereto for selecting the second frequency. When either of these voltages is applied by the switch 34, and the contacts 94*c* of relay 94 close because of operation of the foot switch 37, a control voltage is applied to the transformer to render it operative. The value of the control voltage selects the frequency of operation of the transmitter.

As has been previously stated, it is possible to provide control of the equipment at one wayside station from another wayside station. For such operation emergency switches 105, 106 and 107 are provided in the termination and filter unit 38. The switch 105 provides ground to the relay 73 so that the station is selected and is thereby connected to the dispatch circuit. Switch 106 completes the circuit from the contacts of selector 65 to the relay 70 to provide the frequency selection during normal operation. For emergency operation the switch 106 may be moved to a second position which is open so that the relay 70 is deenergized for providing the number one frequency. When the switch 106 is moved to the number 3 position, the relay 70 is grounded and is thereby energized to provide the number 2 frequency.

The third emergency switch which is designated 107 has two sets of contacts. Contacts 107*a* break the circuit between the selector 64 and the relay 72 so that the dispatcher cannot open the normal incoming circuit by causing operation of the relay 72. The second contacts 107*b* are for providing a circuit between terminal 100 and the emergency push-to-talk generator 81 for energizing the generator so that push-to-talk signals are applied to the line from the generator when the wayside operator desires to transmit, as indicated by operation of the foot switch 37.

The emergency switches permit various different types of emergency operation, which permit continued communication over the system in the event of a failure in the dispatch circuit. The first condition is when it is desired to control other wayside stations from a first wayside station, all of which are on the same side of the dispatch circuit failure, so that the dispatch circuit between these stations is not interrupted. This can be accomplished by closing switch 105 to select the station, setting switch 106 to select the desired frequency, and operating switch 107 to open contacts 107*a* and close contacts 107*b*. Then the particular wayside station which had been so operated can control other wayside stations on the same dispatch circuit.

As previously stated, the equipment may also be used to provide radio communication across a break in the dispatch circuit. Considering the system of Fig. 1, let us assume that break has occurred between station 12A and wayside station 12B, and that the dispatcher desires to communicate with the operator at wayside station 12C. In such a case the dispatcher may control the radio equipment at wayside station 12A by selecting this station and operating in the usual manner. The operator at wayside station 12B will hear this transmission over the radio and can operate switches 105 and 106 which connect his radio equipment to the dispatch circuit extending beyond station 12B.

Accordingly, the gap is bridged and the signals continue down the dispatch line to the wayside station 12C so that the operator at station 12C will receive his message. For the operator at station 12C to talk back he will have to operate switch 107 at his wayside station so that push-to-talk tones will be generated thereat which will operate the transmitter at station 12B. The operator at 12C can therefore talk to the dispatcher through the dispatch circuit from wayside station 12C to wayside station 12B, then over the radio between stations 12B and 12A, and over the circuit to the dispatcher.

As previously stated, in order for the system as disclosed to work properly over a relatively long division, and in which a wire line is used to provide the dispatch circuit, the compression amplifiers must be quite effective to compensate for changes in level at the different points in the system. As previously stated, the push-to-talk tones are transmitted simultaneously during transmission and therefore these tones can be used as pilot tones for adjustment of the level of the compression amplifiers. Although compression amplifiers of various constructions can be used, the compression amplifier disclosed and claimed in the copending application of Arnet A. Curry and Peter Castro, Serial No. 324,048, filed December 4, 1952, now Patent No. 2,784,263, issued March 5, 1957, is particularly applicable in the system above described.

It is to be pointed out that although certain facilities which are believed to be most essential for control of a division by the dispatcher have been described, the equipment can be modified in various ways to provide additional controls and different modes of operation. For example, additional controls can be provided by the use of more tone generators in the dispatcher unit and more selectors at the wayside stations. Similarly other variations may be made in the system.

The invention herein is not to be limited to the specific circuits and systems disclosed but encompasses various changes and modifications within the scope of the appended claims.

I claim:

1. Communication equipment for a system which includes a dispatcher office, a plurality of remote stations and a communication channel interconnecting the dispatcher office and the remote stations; said communication equipment including in combination, radio transmitting and receiving equipment positioned at each remote station; terminal equipment at the dispatcher office including, means for sending and receiving messages by use of frequencies in the range from 30 to 3000 cycles, means for selectively providing control signals including tones of different frequencies in the range from 0 to 3000 cycles, and amplifier means for applying said messages and said control signals to said communication channel including independently adjustable level control means for said messages and said control signals; and control equipment at each remote station including microphone means and speaker means, and circuit means selectively connecting said communication channel to said radio equipment, said circuit means including selective means responsive to said control signals and operative in response to a signal including a predetermined tone for causing operation of said circuit means to connect said communication channel to said radio equipment for transmission of messages thereover and operative in response to a signal including a different tone to provide a direct current signal for controlling the operation of said radio equipment; whereby said radio equipment at the remote station may be controlled remotely from the dispatcher office over said communication channel.

2. Communication equipment for a system which includes a dispatcher office, a plurality of remote stations, and a communication channel interconnecting the dispatcher office and the remote stations; said communication equipment including in combination, radio transmitting and receiving equipment positioned at each remote station; terminal equipment at the dispatcher office including means for sending and receiving messages and control signals over the communication channel, generator means providing a first group of control signals including tones of different frequencies for selecting individual remote stations and additional control signals including tones of different frequencies for controlling the radio equipment at the selected station, and selector means for controlling the transmission of said control signals; and control equipment at each remote station including control means, first selective means responsive to the frequency of said tones of one of said control signals of said first group for selectively connecting said control means to said communication channel, second selective means responsive to the frequency of said tones of said additional control signals for providing a direct current signal for controlling said radio equipment, said control means at each remote station including microphone and speaker means and means manually operative to provide a direct current signal for controlling said radio equipment, and circuit means selectively connecting said control means and said communication channel to said radio equipment, whereby said radio equipment at the remote side station may be operated locally thereat and also remotely from the dispatcher office over said communication channel.

3. Communication equipment for a system which includes a dispatcher office, a plurality of remote stations and a communication channel interconnecting the dispatcher office and the remote stations; said communication equipment including in combination, radio transmitting and receiving equipment positioned at each remote station and adapted to be selectively operated on a plurality of different frequencies; terminal equipment at the dispatcher office including means for sending and receiving messages and control signals over the communication channel, generator means providing a first group of tones of different frequencies for selecting individual remote stations and additional tones of different frequencies for selecting the frequency of said radio equipment at the selected station, and selector means for controlling the transmission of said tones; and control equipment at each remote station including microphone means and speaker means, first selective means responsive to said tones of said first group for selectively connecting said control equipment to said communication channel, second selective means responsive to said additional tones for producing direct current signals of different potentials for controlling the frequency of said radio equipment, said control equipment at each remote station including means manually operable thereat for producing direct current signals of different potentials for controlling the frequency of said radio equipment, and circuit means selectively connecting said microphone and speaker means and said communication channel to said radio equipment and selectively applying direct current signals from said second selective means and from said manually operable means to said radio equipment; whereby said radio equipment at the remote station may be operated locally thereat and also remotely from the dispatcher office over said communication channel.

4. Communication equipment for a system which includes a dispatcher office, a plurality of remote stations and a communication channel interconnecting the dispatcher office and the remote stations; said communication equipment including in combination, radio transmitting and receiving equipment positioned at each remote station; terminal equipment at the dispatcher office including means for sending and receiving messages and control signals over the communication channel, said terminal equipment including means selectively applying first and second control signals including tones of different frequencies to the communicating channel; and control equipment at each remote station including microphone means and speaker means, selective means responsive to said control signals, and circuit means selectively operable for connecting said microphone and speaker means and said communication channel to said radio equipment, whereby said radio equipment at the remote station may be controlled locally thereat and also remotely from the dispatcher office over said communication channel, said selective means at each remote station responding to a first control signal including at least one tone of a particular frequency to establish a circuit from said communication channel to said circuit means at the remote station, and responding to said second control signal including at least one tone of a different frequency for providing a direct current signal to render said radio transmitting equipment at a selected remote station operative when said circuit means thereat connects said communication channel to said radio equipment.

5. Communication equipment for a system which includes a dispatcher office, a plurality of remote stations and a communication channel interconnecting the dispatcher office and the remote stations; said communication equipment including in combination, radio transmitting and receiving equipment positioned at each remote station; terminal equipment at the dispatcher office including means for sending and receiving messages and control signals including tones of different frequencies over the communication channel, said terminal equipment including means selectively applying control signals including at least one predetermined tone to said communicating channel concurrently with the sending of messages from the dispatcher office; and control equipment at each remote station including microphone means and speaker means, selective means responsive to said control signals, and circuit means selectively operable for connecting said microphone and speaker means to said communication channel and to said radio equipment, said selective means at each remote station responding to said control signals including at least one tone to connect said communication channel to said radio equipment thereat and responding to a control signal including said predetermined tone for providing a direct current signal to render said radio transmitting equipment at such remote station operative, said control equipment at each remote station including manually operable means for providing a direct current signal for rendering said transmitting equipment thereat operative for local operation of said radio equipment, whereby said radio equipment at each remote station may be controlled locally thereat and also remotely from the dispatcher office over said communication channel.

6. Communication equipment for a system which includes a dispatcher office, a plurality of remote stations and a communication channel interconnecting the dispatcher office and the remote stations; said communication equipment including in combination, radio transmitting and receiving equipment positioned at each remote station; terminal equipment at the dispatcher office including means for sending and receiving messages and control signals over the communication channel, said terminal equipment including means for automatically applying push-to-talk control signals including tones of predetermined frequencies to said communicating channel concurrently with the sending of messages from the dispatcher office; and control equipment at each remote station including microphone means and speaker means, selective means responsive to said control signals, and circuit means selectively operable for connecting said microphone and speaker means and said communication channel to said radio equipment, so that said radio equipment at each remote station may be controlled locally thereat and also remotely over said communication channel, said selective means at each remote station responding to said control signals applied concurrently with a message and including said tones of predetermined frequencies for providing a direct current signal to render said radio transmitting equipment at such remote station operative when said circuit means thereat connects said communication channel to said radio equipment, said control equipment of at least one of said remote stations including auxiliary means for applying push-to-talk control signal tones of said predetermined frequencies to said communication channel concurrently with the sending of messages from said one remote station, whereby said one remote station can control the radio equipment at the other remote stations.

7. Communication equipment for a system which includes a dispatcher office, a plurality of remote stations and a communication channel interconnecting the dispatcher office and the remote stations; said communication equipment including in combination, radio transmitting and receiving equipment positioned at each remote station; terminal equipment at the dispatcher office including means for sending and receiving messages and control signals over the communication channel, said terminal equipment including means selectively applying push-to-talk control signals to said communicating channel concurrently with the sending of messages from the dispatcher office; and control equipment at each remote station including microphone means and speaker means, selective means responsive to said control signals, and circuit means selectively operable for connecting said microphone and speaker means and said communication channel to said radio equipment, so that said radio equipment at each remote station may be controlled locally thereat and also remotely over said communication channel, said selective means at each remote station responding to said control signals to render said radio transmitting equipment at such remote station operative when said circuit means thereat connects said communication channel to said radio equipment, said control equipment at said remote stations including auxiliary means selectively operable for applying push-to-talk control signals to said communication channel concurrently with the sending of messages therefrom, whereby any remote station can control the radio equipment at the other remote stations.

8. Communcation equipment for a system including a dispatcher office and a plurality of remote stations including in combination, a communication channel interconnecting the dispatcher office and the remote stations, radio transmitting and receiving equipment positioned at each remote station, control equipment at the dispatcher office including first microphone and speaker means for sending and receiving messages over said communication channel and means for selectively sending first, second and third control signals including tones of different frequencies over said channel to said stations, and control equipment at each remote station including second microphone and speaker means, and circuit means for normally connecting said microphone means and said radio equipment to said communication channel for communicating to said dispatcher office, said circuit means including first means selectively responsive to a first control signal including at least one tone of a predetermined frequency for selecting such remote station and connecting said communication channel to said radio equipment at the remote station for transmission thereover of signals from said dispatcher office, said circuit means including second means responsive to said second control signal including at least one tone of a frequency different from said predetermined frequency for controlling said radio equipment when connected to said communication channel, said circuit means also including third means responsive to said third control signal which includes at least one tone of a frequency different from the tones of said first and second signals for opening the normally closed circuits connecting said microphone means and said radio equipment to said communication channel at all of said remote stations except the selected station to prevent the reception at said dispatcher office of signals from the remote stations not selected.

9. Communication equipment for a system including a dispatcher office and a plurality of remote stations including in combination, a communication channel interconnecting the dispatcher office and the remote stations, radio transmitting and receiving equipment positioned at each remote station, control equipment at the dispatcher office including first microphone and speaker means for sending and receiving messages having frequencies in the range from 300 to 3000 cycles over said communication channel and means for selectively sending first, second and third control signals including tones of different frequencies in the range from 0 to 3000 cycles over said channel to said stations, and control equipment at each remote station including second microphone and speaker means, and circuit means for selectively connecting said communication channel to said radio equipment, said circuit means including first means selectively responsive to a first control signal including at least one tone of a predetermined frequency for selecting a remote station and connecting said communication channel to said radio equipment at the selected remote station, second means selectively responsive to said second control signal for operating said radio equipment when selected for transmission from said dispatcher office, said circuit means including ringing means and third means responsive to said third control signal including a tone of a frequency different from said predetermined frequency for operating said ringing means at a selected remote station, said ringing means applying a signal over said communication channel to said control equipment at the dispatcher office to indicate operation of said ringing means.

10. Communication equipment for a system including a dispatcher office and a plurality of remote stations including in combination, a communication channel interconnecting the dispatcher office and the remote stations, radio transmitting and receiving equipment positioned at each remote station, control equipment at the dispatcher office including first microphone and speaker means for sending and receiving messages having frequencies in the range from 300 to 3000 cycles over said communication channel and means for selectively sending first and second control signals including tones of different frequencies in the range from 0 to 3000 cycles over said channel to said stations, and control equipment at each remote station including second microphone and speaker means, and circuit means for selectively connecting said communication channel to said radio equipment, said circuit means including first means selectively responsive to a first control signal including a tone of a predetermined frequency for individually selecting such remote station and connecting said communication channel to said radio equipment at the remote station, said first means including a portion operating to prevent communication from the dispatcher office to a remote station not selected, said circuit means also including second means responsive to said second control signal including a tone of a frequency different from said predetermined frequency for selecting such remote station and connecting said communication channel to said radio equipment, with said second responsive means at a plurality of remote stations responding to tones of the same frequency, whereby said first control signal selects individual remote stations and said second control signal selects a plurality of remote stations.

11. Communication equipment for a system which includes a dispatcher office, a plurality of remote stations and a communication channel interconnecting the dispatcher office and the remote stations; said communication equipment including in combination, radio transmitting and receiving equipment positioned at each remote station; terminal equipment at the dispatcher office including means for sending and receiving messages and control signals over the communication channel, said terminal equipment including means for selectively applying to said communicating channel station selecting control signals and for automatically applying thereto push-to-talk control signals concurrently with the sending of messages from the dispatcher office; and control equipment at each remote station including microphone means and speaker means, selective means responsive to said control signals, and circuit means selectively operable for connecting said microphone and speaker means and said communication channel to said radio equipment, so that said radio equipment at each remote station may be controlled locally thereat and also remotely over said communication channel, said selective means at each remote station responding to a predetermined station selecting control signal to connect said communication channel to said radio equipment thereat, said selective means at a selected remote station further responding to said push-to-talk control signals to render said radio transmitting equipment at such remote station operative when said circuit means thereat connects said communication channel to said radio equipment, said control equipment at said remote stations including selectively operable auxiliary means for applying push-to-talk control signals to said communication channel concurrently with the sending of messages therefrom and manually operable switch means for connecting said communication channel to said radio equipment thereat, whereby a remote station having said auxiliary means thereof operated can control the radio equipment at a remote station having said switch means thereof operated.

12. Communication equipment for a system which includes a dispatcher office, at least first, second and third remote stations, and a communication channel interconnecting the dispatcher office and the remote stations in series in the order named; said communication equipment including in combination, radio transmitting and receiving equipment positioned at each remote station; terminal equipment at the dispatcher office including means for sending and receiving messages and control signals over the communication channel, said terminal equipment including means for selectively applying to said communicating channel station selecting control signals and for automatically applying thereto push-to-talk control signals concurrently with the sending of messages from the dispatcher office; and control equipment at each remote station including microphone means and speaker means, selective means responsive to said control signals, and circuit means selectively operable for connecting said microphone and speaker means and said communication channel to said radio equipment, so that said radio equipment at each remote station may be controlled locally thereat and also remotely over said communication channel, said selective means at each remote station responding to a predetermined station selecting control signal to connect said communication channel to said radio equipment thereat, said selective means at a selected remote station further responding to said push-to-talk control signals to render said radio transmitting equipment at such remote station operative when said circuit means thereat connects said communication channel to said radio equipment, said control equipment at said remote stations including selectively operable auxiliary means for applying push-to-talk control signals to said communication channel concurrently with the sending of messages therefrom and manually operable switch means for connecting said communication channel to said radio equipment thereat, whereby communication can be provided between the dispatcher office and the third remote station in the event of failure of said communication channel between the first and second remote stations by selection of the second remote station at the dispatcher office, operation of said auxiliary means at the third remote station, and operation of said switch means at the second remote station, so that said communication channel is completed through by radio communication between the first and second remote stations.

13. Communication equipment for a system which includes a dispatcher office, at least first, second and third remote stations and a communication channel interconnecting the dispatcher office and the remote stations in series in the order named; said communication equipment including in combination, terminal equipment at the dispatcher office including means for sending and receiving messages and control signals over the communication channel, said terminal equipment including means for selectively applying to said communicating channel station selecting control signals and for automatically applying thereto push-to-talk control signals concurrently with the sending of messages from the dispatcher office; and control equipment at each remote station including selective means responsive to said control signals, and radio transmitting and receiving equipment, said selective means at each remote station responding to a predetermined station selecting control signal to connect said communication channel to said radio equipment thereat, said selective means at a selected remote station further responding to said push-to-talk control signals to render said radio transmitting equipment at such remote station operative when said circuit means thereat connects said communication channel to said radio equipment, said control equipment at said remote stations including selectively operable auxiliary means for applying push-to-talk control signals to said communication channel concurrently with the sending of messages from said one remote station, and manually operable switch means for connecting said communication channel to said radio equipment thereat for transmission of signals from said communication channel over said radio transmitting equipment, whereby communication can be provided between the dispatcher office and the third remote station in the event of failure of said communication channel between the first and second remote stations by selection of the second remote station at the dispatcher office, operation of said auxiliary means at the third remote station, and operation of said switch means at the second remote station, so that said communication channel is completed through by radio communication between the first and second remote stations.

14. Communication equipment for a system which includes a dispatcher office, a plurality of remote stations and a communication channel interconnecting the dispatcher office and the remote stations; said communication equipment including in combination, radio transmitting and receiving equipment positioned at each remote station; terminal equipment at the dispatcher office including means for sending and receiving messages and control signals over the communication channel, said terminal equipment including means for automatically applying push-to-talk control signals of predetermined frequency to said communication channel concurrently with the sending of messages thereover from the dispatcher office; and control equipment at each remote station including amplifier means connected to said communication channel, microphone means, speaker means, circuit means connecting the output of said amplifier means to said speaker means and to said radio equipment, so that signals from said dispatcher office may be transmitted over said radio equipment at the remote stations, and selective means connected to said amplifier means and responding to said push-to-talk control signals to render said radio transmitting equipment at such remote stations operative, said amplifier means including automatic gain control means responsive to the frequency of said push-to-talk control signals for holding the output of said amplifier at said frequencies substantially constant.

15. Communication equipment for a system which includes a dispatcher office, a plurality of remote stations and a communication channel interconnecting the dispatcher office and the remote stations; said communication equipment including in combination; terminal equipment at the dispatcher office including means for sending and receiving messages and control signals over the communication channel, said terminal equipment including means for automatically applying thereto continuous control signal including at least one tone of a predetermined frequency in the low audio frequency range concurrently with the sending of messages from the dispatcher office; and control equipment at each remote station including amplifier means connected to said communication channel, microphone means, speaker means, selective means responsive to said control signals for operating said control equipment in the presence of said signal including said one tone of predetermined frequency, said amplifier means having means responsive to the amplitude of said one tone for automatically controlling the gain thereof and holding the output thereof substantially constant independently of the level of the input thereto, said gain controlling means continuously controlling the gain of said amplifier in accordance with the amplitude of said one tone, and high pass filter means connecting said speaker means to the output of said amplifier means and applying only signals having a frequency above said predetermined frequency to said speaker means.

16. Communication equipment in accordance with claim 4 wherein said means included by said terminal equipment at the dispatcher office for sending and receiving messages and control signals over the communication channel includes, loudspeaker means, microphone means, and push-to-talk switch means, with said loudspeaker means being normally connected to the communication channel, said push-to-talk switch means being operative to connect said microphone means to the communication channel and to apply said second control signal to the communication channel to provide transmission from the dispatcher office, said push-to-talk switch means being coupled to said loudspeaker means to reduce the level of signals reproduced thereby during transmissions from the dispatcher office.

References Cited in the file of this patent

UNITED STATES PATENTS

| | | |
|---|---|---|
| 1,552,919 | Gauthier | Sept. 8, 1925 |
| 1,940,881 | Ports | Dec. 16, 1933 |
| 1,945,082 | Sandeman et al. | Jan. 30, 1934 |
| 2,112,877 | Beverage | Apr. 5, 1938 |
| 2,129,332 | Mastini | Sept. 6, 1938 |
| 2,393,291 | Clark | Jan. 22, 1946 |
| 2,407,417 | Halstead | Sept. 10, 1946 |
| 2,433,281 | Lord | Dec. 23, 1947 |
| 2,490,061 | Jensen et al. | Dec. 6, 1949 |
| 2,495,452 | Grove | Jan. 24, 1950 |
| 2,508,613 | Lang | May 23, 1950 |
| 2,515,855 | Bossart et al. | July 18, 1950 |
| 2,550,958 | Bossart | May 1, 1951 |
| 2,589,158 | Staples | Mar. 11, 1952 |
| 2,597,818 | Preston | May 20, 1952 |
| 2,623,164 | Herrick | Dec. 23, 1952 |
| 2,636,113 | Deloraine | Apr. 21, 1953 |
| 2,641,688 | Adams | June 9, 1953 |
| 2,698,377 | Korman | Dec. 28, 1954 |
| 2,710,341 | Winkler | June 7, 1955 |